Patented June 19, 1923.

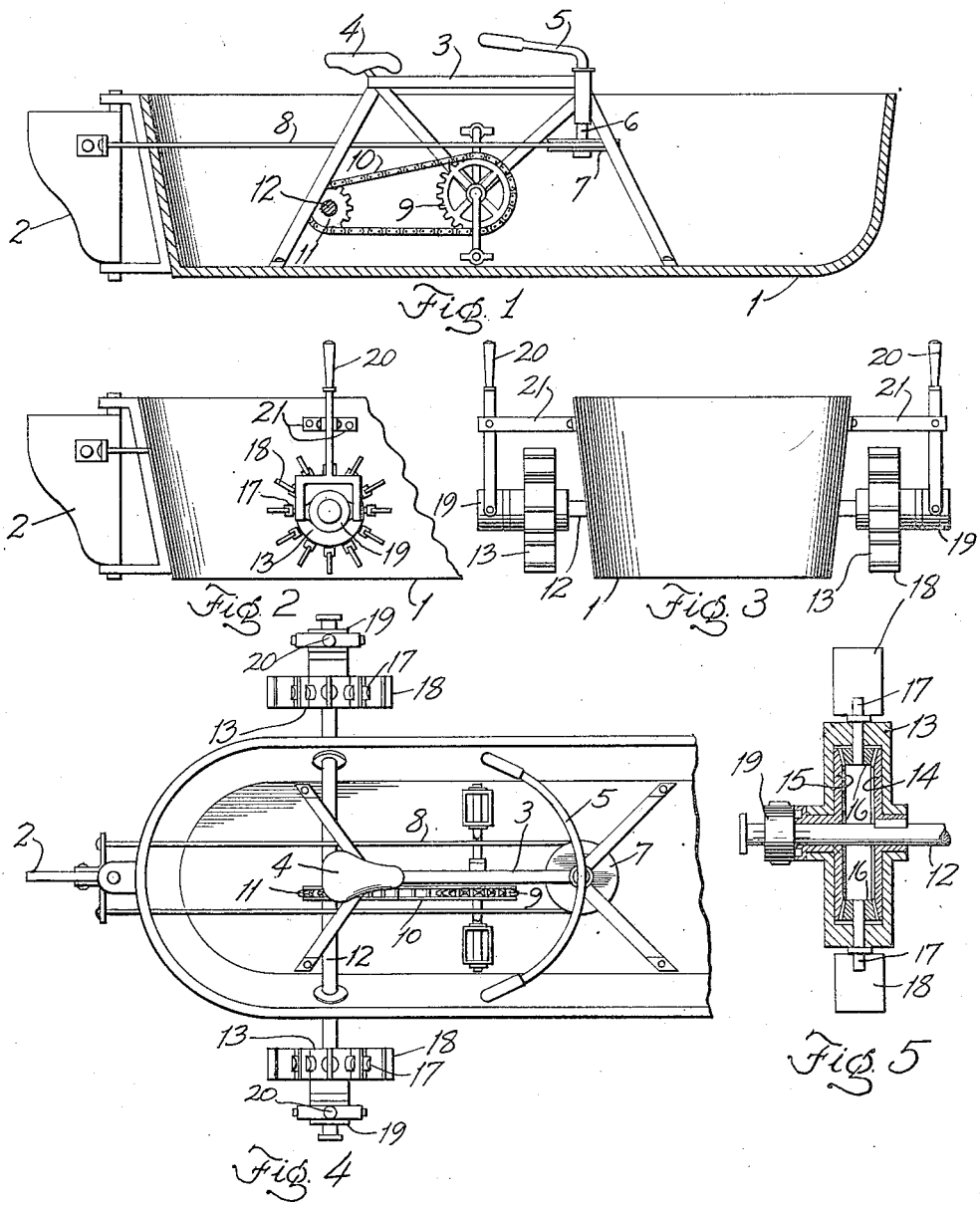

1,459,297

UNITED STATES PATENT OFFICE.

GUSTAVE SWAN, OF SIOUX FALLS, SOUTH DAKOTA.

BICYCLE BOAT.

Application filed September 28, 1921. Serial No. 503,768.

*To all whom it may concern:*

Be it known that I, GUSTAVE SWAN, a citizen of Norway, residing at Sioux Falls, in the county of Minnehaha and State of South Dakota, have invented certain new and useful Improvements in Bicycle Boats, of which the following is a specification.

This invention relates to improvements in bicycle boats. One object is to provide a boat of this type in which the driving and steering parts are so arranged that it is possible to readily drive the boat forward or backward or to cause it to turn as upon a pivot in order to effect a perfect landing without particular effort on the part of the operator. A further object is to provide a novel boat of this type that is cheap to manufacture and simple and efficient in operation.

With the foregoing and other objects in view the invention consists in the combination and arrangement of parts to be hereinafter fully described, pointed out in the appended claims and illustrated in the accompanying drawing which forms a part of this application and in which—

Fig. 1 is a longitudinal sectional view through the hull of the boat.

Fig. 2 is a fragmentary view of the boat in side elevation.

Fig. 3 is a fragmentary front end view.

Fig. 4 is a fragmentary plan view.

Fig. 5 is an enlarged fragmentary sectional view illustrating the construction of one of the paddle wheels.

Like reference characters denote corresponding parts throughout the several views.

The reference numeral 1 denotes the hull of the boat and 2 the rudder. Within the hull of the boat is the bicycle frame 3 having the seat 4 and handle bars 5, the stem 6 of which is provided with the sheave 7 that is connected by the steering cable 8 with the rudder 2. The sprocket wheel 9 is connected by sprocket chain 10 to the pinion 11 fast upon the transverse drive shaft 12 that extends through the sides of the hull and is provided at its ends with the paddle wheels 13.

Each paddle wheel 13 comprises a casing within which are two faced bevel gears 14, 15 which are connected by a plurality of bevel pinions 16 the shafts 17 of which extend through the paddle wheel casing and are provided with the paddles 18. The bevel gears 14 are keyed to the shaft 12 but the bevel gears 15 are loose thereupon but adapted for releasable engagement with the sliding clutches 19 slidable upon said shaft and controlled by the hand levers 20 fulcrumed to supporting arms 21 carried by the hull.

When it is desired to propel the boat forward the operator pedals the bicycle and so rotates the shaft 12 in one direction. If the clutches 19 are engaged with the bevel gears 15 the paddle wheel casing will be caused to rotate and the paddles 18 to impel the boat forward. Pedaling in the opposite direction will reverse the shaft 12 and paddle wheels. To cause the boat to pivot the operator throws out one of the clutches which will cause the shaft 12 through one of the bevel gears 14 and bevel pinions 16 to rotate the paddles 18 while the paddle wheel casing does not rotate. The operator from his seat is in easy reach of the handle bars 5 and also of the levers 20.

What is claimed is:—

1. In a bicycle boat, a transverse shaft extending through the sides of the boat hull, paddle wheels, and means for releasably securing said paddle wheels to said transverse shaft, the paddles of said paddle wheels being adapted for rotation independently thereof when said paddle wheels and transverse shaft are disconnected and said transverse shaft is rotating.

2. In a bicycle boat, a transverse shaft extending through the sides of the boat hull, paddle wheel casings loose upon said transverse shaft, faced bevel gears within said paddle wheel casings, one of each pair of faced bevel gears being keyed to said transverse shaft, bevel pinions connecting said faced bevel gears, shafts for said bevel gears extending through said paddle wheel casings, paddles carried by said bevel gear shafts, and clutches for releasably securing the non-keyed bevel gears to said transverse shaft.

In testimony that I claim the foregoing as my own I have hereto affixed my signature in the presence of two subscribing witnesses.

GUSTAVE SWAN.

Witnesses:
D. S. JOHNSON,
L. N. HOSTTETER.